United States Patent [19]

Gross

[11] Patent Number: 5,509,317
[45] Date of Patent: Apr. 23, 1996

[54] LOAD CELL MOUNTING

[75] Inventor: Peter L. Gross, Indianapolis, Ind.

[73] Assignee: Illinois Tool Works, Inc., Glenview, Ill.

[21] Appl. No.: 319,936

[22] Filed: Oct. 7, 1994

[51] Int. Cl.$^6$ ........................................ G01L 1/04
[52] U.S. Cl. ........................ 73/862.632; 73/862.636; 177/244
[58] Field of Search .................. 73/862.632, 862.636, 73/862.637, 862.638, 862.642, 862.541, 862.621; 177/244

[56] References Cited

U.S. PATENT DOCUMENTS

| | | |
|---|---|---|
| 4,191,055 | 3/1980 | Orem et al. . |
| 4,566,341 | 1/1986 | Kovacs ............................ 73/862.321 X |
| 4,589,291 | 5/1986 | Sander ............................ 73/862.632 X |
| 4,789,035 | 12/1988 | Hamilton et al. .............. 73/862.632 X |
| 4,813,504 | 3/1989 | Kroll ............................... 73/862.632 X |
| 4,828,055 | 5/1989 | Hamilton et al. ................... 177/244 X |
| 4,858,475 | 8/1989 | Jacobsen et al. .................. 73/862.631 |
| 5,072,799 | 12/1991 | Freeman et al. ........................ 177/244 |

Primary Examiner—Richard Chilcot
Assistant Examiner—Elizabeth L. Dougherty
Attorney, Agent, or Firm—Barnes & Thornburg

[57] ABSTRACT

A load cell mounting arrangement for a load cell having first and second ends and a pair of output terminals across which an output signal appears when the load cell is subjected to compressive stress exerted between the first and second ends. The mounting arrangement comprises first and second mechanical interface members for positioning between a first surface and a second surface between which the load cell is to measure compressive stress. The first and second mechanical interface members have first and second mechanical interface member interface surfaces, respectively. The first and second mechanical interface member interface surfaces contact the first and second surfaces, respectively, each substantially at a point. First and second coupling collars permit non-compressive relative movement between the first and second surfaces, respectively, and the first and second mechanical interface member interface surfaces, respectively, substantially without altering the load cell output signal.

27 Claims, 2 Drawing Sheets

LOAD CELL MOUNTING

This invention relates to load cell mountings. It is believed to be applicable to load cells in general, for example, quartz, ceramic, and other similarly rigid types. The invention is described in the context of an imbalance determining machine for rotary elements, such as inflated vehicle tires or tire-and-wheel assemblies, but it is believed to be useful in other applications as well.

A difficulty in the application of single-axis load cells arises from the fact that such load cells are not inherently unidirectional. That is, they are not capable of rejecting shear stresses while sensing only longitudinal stresses. In fact, such load cells typically are highly omnidirectional. If such a load cell is placed in tension or compression by a rigid mounting with the aim of measuring only tensile and/or compressive stress, then any shear stress that may arise can produce an error in measurement. Such errors are reflected in the so-called cross-talk error of the load cell. Cross talk can be a major source of error in load cell output. Since single axis load cells typically are not capable of axis discrimination, the error, once introduced, cannot be removed without an additional, independent mechanism for measuring the error source. An independent second sensor can be used in some multiaxis sensors, but the process is imperfect and expensive. The aim of this invention is to improve tensile and/or compressive stress sensitivity discrimination in load cell mountings.

According to the invention, load cell mounting arrangement is provided for a load cell having first and second ends and a pair of output terminals across which an output signal appears when the load cell is subjected to compressive stress exerted between the first and second ends. The mounting arrangement comprises a first mechanical interface member for positioning between a first surface and a second surface between which the load cell is to measure compressive stress. The first mechanical interface member has a first mechanical interface member interface surface. The first mechanical interface member interface surface contacts the first surface substantially at a point. First coupling means permits non-compressive relative movement between the first surface and the first mechanical interface member interface surface substantially without altering the output signal.

Illustratively according to the invention, a second mechanical interface member has a second mechanical interface member interface surface for contacting the second surface substantially at a point. The second mechanical interface surface lies between the first mechanical interface member interface surface and the second surface. The apparatus further comprises second coupling means for permitting non-compressive relative movement between the second surface and the second mechanical interface member interface surface substantially without altering the output signal.

According to an illustrative embodiment, the first and second coupling means comprise first and second collars for attachment to the first and second mechanical interface members, respectively. The first and second collars surround the first and second surfaces and resiliently maintain the first and second surfaces, respectively, and the first and second mechanical interface member interface surfaces, respectively, substantially in alignment with each other while providing substantial isolation of the load cell from shear stress exerted between the first and second surfaces.

According to another illustrative embodiment, the first and second coupling means comprise first and second collars for attachment to the first and second surfaces, respectively. The first and second collars surround the first and second mechanical interface member interface surfaces and resiliently maintain the first and second surfaces, respectively, and the first and second mechanical interface member interface surfaces, respectively, substantially in alignment with each other while providing substantial isolation of the load cell from shear stress exerted between the first and second surfaces.

Illustratively, one of the first surface and the first mechanical interface member interface surface, and one of the second surface and the second mechanical interface member interface surface are generally convex. Further illustratively, these generally convex surfaces are generally part-spherical. Additionally illustratively, the collars comprise elastomeric O-rings.

The invention may best be understood by referring to the following description and accompanying drawings which illustrate the invention. In the drawings.

Figure 1:
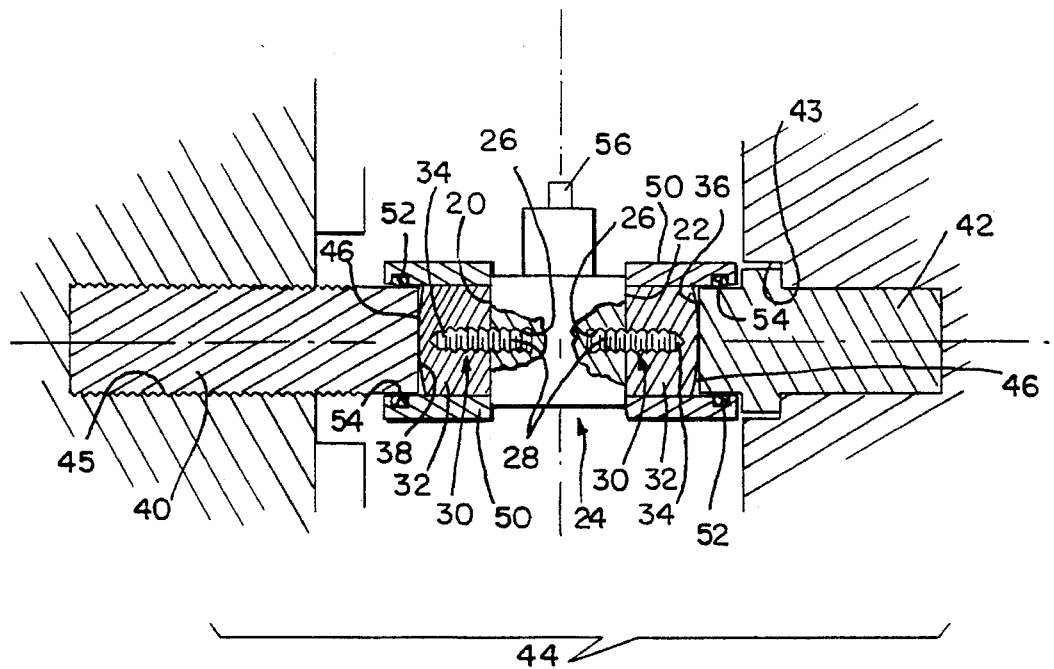
FIG. 1 illustrates a partial axial sectional view of a load cell mounting according to the present invention.

Referring to FIG. 1, the two ends 20, 22 of a load cell 24 are flat and each is provided with a threaded hole 26 for mounting. Load cell 24 illustratively is a Series 208 force transducer with built-in amplifier available from PCB Piezotronics Inc., 3425 Walden Avenue, Depew, N.Y. 14043-2495. One end 28 of a threaded stud 30 is screwed into the threaded hole 26 provided at each end 20, 22 of the load cell. A contact tip 32 appropriate for the application is then threaded onto the remaining, exposed end 34 of each stud 30.

Compressive stress is to be measured between the facing surfaces 36, 38 of two slugs 40, 42 mounted, for example, on the spindle housing and frame, respectively, of a rotary element imbalance determining machine 44 of the general type described in U.S. Pat. No. 4,191,055. Slugs 40, 42 are used because the contact surfaces are machined very smooth, flat and perpendicular to the axis of the load cell 24, and the material to which contact is made is hard. Of course, one or the other or both of the slugs 40, 42 could be part of the structure of the machine 44 proper, if the machine builder wanted to make a machine 44 surface or surfaces out of a suitable material, for example, tool steel, and machine or otherwise finish each such surface.

Slug 42 is fitted in a drilled pocket 43. Slug 40 is movable 45 to the left or to the right with respect to slug 42 for load cell 24 preloading purposes. This arrangement is intended to measure compressive stresses, which is the object of the majority of single axis load cell applications. However, suitable fixturing can also be devised to measure tensile stresses. The contact tips 32, which are also constructed from hardened, machined materials, have dome-shaped surfaces 46 that contact the surfaces 36, 38 of machine 44 between which compressive stress is to be measured. The dome shaped surfaces 46 effectively contact their respective surfaces 36, 38 only at a point. A collar 50 with an internal elastomeric O-ring 52 is provided around each tip 32. Each collar 50 is a steel cylinder that slides over a respective tip 32. A groove 54 is formed inside the collar 50 for retaining the O-ring 52. There is no direct contact between the collar 50 and a respective slug 40, 42.

This arrangement is sufficiently stiff to maintain alignment of components 40, 32, 24, 32, 42 while the load cell 24 is put in place and preloaded. Parenthetically, the preload is typically half of the load cell 24's nominal rated range, but that is not critical. Once the preload is established, the load cell 24 does not normally approach a neutral or unloaded condition. If any abnormal event should occur such that the load cell 24 would become momentarily unloaded, the mounting 40, 52, 50, 32, 24, 32, 50, 52, 42 will keep the load cell 24 in position. As a result, the load cell 24 will not become misaligned but will return to its previous condition when the abnormal event is cleared.

This arrangement also promotes axial isolation of the load cell 24 from lateral, or shear, stresses by virtue of the collars 50 and elastomeric O-rings 52. The O-rings 52 in the mounting collars 50 introduce sufficient stiffness to maintain alignment, but are very flexible in relation to the stiffness of the remaining components 40, 50, 32, 24, 32, 50, 42. As a result, lower magnitude shear stresses will be absorbed by elastic deformation of the O-ring 52 material. The mounting is thus compressively very rigid but, with respect to the load cell sensing surfaces 46, very compliant to shear stress. In this way, it isolates compressive stresses from shear stress effects and thus serves to separate compressive and shear stresses. As a result, the load cell 24's output signals at its coaxial connector 56 are more nearly the result strictly of compressive stress divorced from shear effects. Any imperfections in the structure of the machine 44 that might otherwise tend to introduce shear stress into load cell 24 output, and thereby introduce measurement errors, are thereby minimized.

Figure 2:
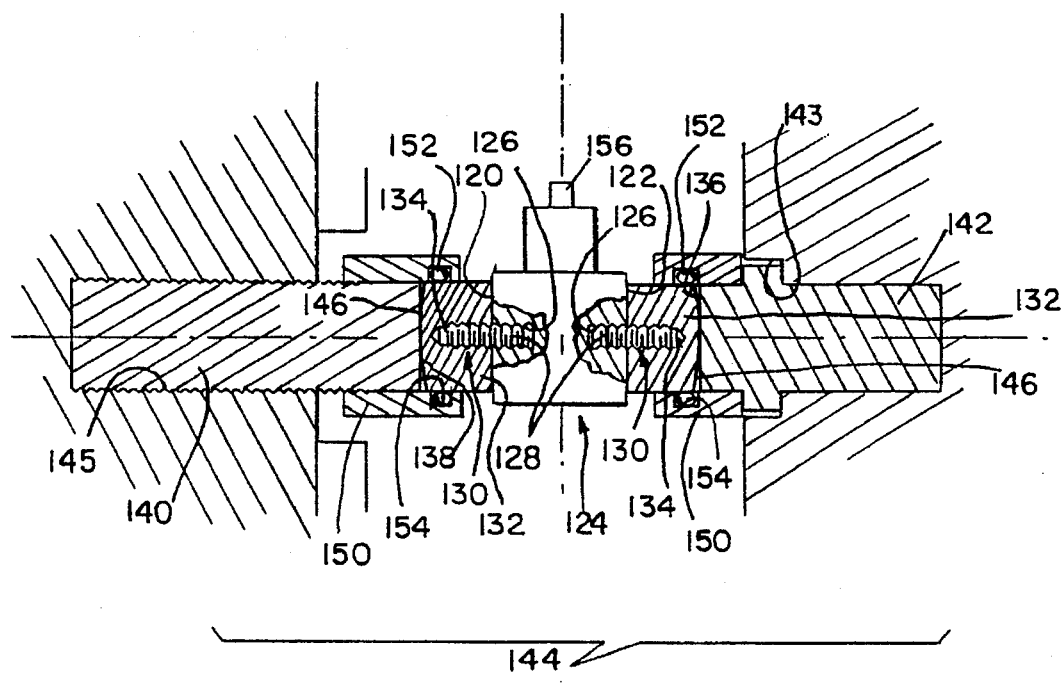
FIG. 2 illustrates a partial axial sectional view of another load cell mounting according to the present invention.

Referring to FIG. 2, the two ends 120, 122 of a load cell 124 are flat and each is provided with a threaded hole 126 for mounting. One end 128 of a threaded stud 130 is screwed into the threaded hole 126 provided at each end 120, 122 of the load cell. A contact tip 132 appropriate for the application is then threaded onto the remaining, exposed end 134 of each stud 130.

Compressive stress is to be measured between the facing surfaces 136, 138 of two slugs 140, 142 mounted, for example, on the spindle housing and frame, respectively, of a rotary element imbalance determining machine 144. Slug 142 is fitted in a drilled pocket 143. Slug 140 is movable 145 to the left or to the right with respect to slug 142 for load cell 124 preloading purposes. The contact tips 132 are also constructed from hardened, machined materials, and have dome-shaped surfaces 146 that contact the surfaces 136, 138 of machine 144 between which compressive stress is to be measured. The dome shaped surfaces 146 effectively contact their respective surfaces 136, 138 only at a point. A collar 150 with an internal elastomeric O-ring 152 is provided around each slug 140, 142. Each collar 150 is a steel cylinder that slides over a respective slug 140, 142. A groove 154 is formed inside the collar 150 for retaining the O-ring 152. There is no direct contact between the collar 150 and a respective tip 132.

This arrangement maintains alignment of components 140, 132, 124, 132, 142 while the load cell 124 is put in place and preloaded. If any abnormal event should occur such that the load cell 124 would become momentarily unloaded, the mounting 140, 150, 152, 132, 124, 132, 152, 150, 142 will keep the load cell 124 in position. As a result, the load cell 124 will not become misaligned but will return to its previous condition when the abnormal event is cleared.

This arrangement also promotes axial isolation of the load cell 124 from lateral, or shear, stresses by virtue of the collars 150 and elastomeric O-rings 152. The O-rings 152 in the mounting collars 150 introduce sufficient stiffness to maintain alignment, but are very flexible in relation to the stiffness of the remaining components 140, 150, 132, 124, 132, 150, 142. As a result, lower magnitude shear stresses will be absorbed by elastic deformation of the O-ring 152 material. The mounting is thus compressively very rigid but, with respect to the load cell sensing surfaces 146, very compliant to shear stress. In this way, it isolates compressive stresses from shear stress effects and thus serves to separate compressive and shear stresses. As a result, the load cell 124's output signals at its coaxial connector 156 are more nearly the result strictly of compressive stress divorced from shear effects. Any imperfections in the structure of the machine 144 that might otherwise tend to introduce shear stress into load cell 124 output, and thereby introduce measurement errors, are thereby minimized.

Figure 3:
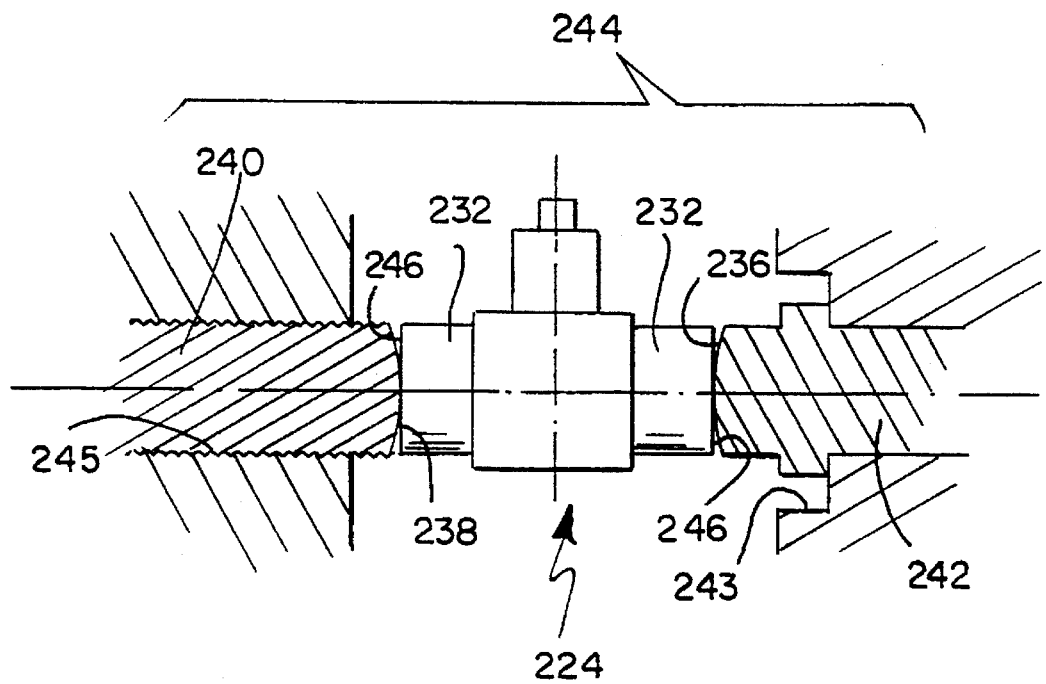
FIG. 3 illustrates a side elevational view of another load cell mounting according to the present invention with the collars removed; and, FIG. 4 illustrates an axial sectional view of another embodiment of a collar of a type for use with the load cell mountings illustrated in FIGS. 1–3.
Figure 4:
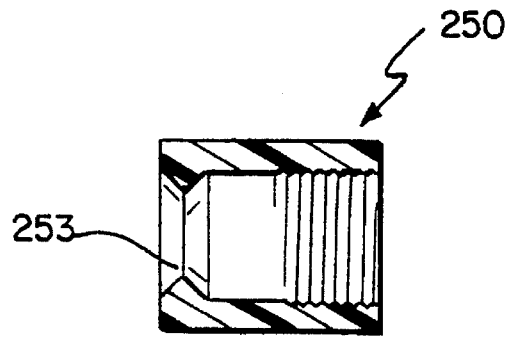

Referring now to FIG. 3, a contact tip 232 appropriate for the application is provided on each end of a load cell 224. Compressive stress is to be measured between the facing surfaces 236, 238 of two slugs 240, 242 mounted, for example, on the spindle housing and frame, respectively, of a rotary element imbalance determining machine 244. Slug 242 is fitted in a drilled pocket 243. Slug 240 is movable 245 to the left or to the right with respect to slug 242 for load cell 224 preloading purposes. In this embodiment, the dome-shaped surfaces are surfaces 236, 238 of machine 244 between which compressive stress is to be measured. The dome shaped surfaces 236, 238 effectively contact their respective surfaces 246 of contact tips 232 only at a point. A collar 250 (FIG. 4) of a suitably stiff resilient material such as nylon, nylatron or other suitable filled or unfilled resin has an edge 253 formed inside the end thereof. One such collar 250 is provided around each slug 240, 242. There is no contact, except for the edge 253, between a respective collar 250 and a respective tip 232.

This arrangement maintains alignment of components 240, 232, 224, 232, 242 while the load cell 224 is put in place and preloaded. If any abnormal event should occur such that the load cell 224 would become momentarily unloaded, the mounting 240, 250, 232, 224, 232, 250, 242 will keep the load cell 224 in position. As a result, the load cell 224 will not become misaligned but will return to its previous condition when the abnormal event is cleared.

This arrangement also promotes axial isolation of the load cell 224 from lateral, or shear, stresses by virtue of the resilient collars 250 and their edges 253. The edges 253 in the mounting collars 250 introduce sufficient stiffness to maintain alignment, but are very flexible in relation to the stiffness of the remaining components 240, 232, 224, 232, 242. As a result, lower magnitude shear stresses will be absorbed by elastic deformation of collar 250 material. The mounting is thus compressively very rigid but, with respect to the load cell sensing surfaces, very compliant to shear stress. In this way, it isolates compressive stresses from shear stress effects and thus serves to separate compressive and shear stresses. As a result, the load cell 224's output signals at its coaxial connector 256 are more nearly the result strictly of compressive stress divorced from shear effects. Any imperfections in the structure of the machine 244 that might otherwise tend to introduce shear stress into load cell 224 output, and thereby introduce measurement errors, are thereby minimized.

What is claimed is:

1. A load cell mounting arrangement for a load cell having first and second ends and a pair of output terminals across which an output signal appears when the load cell is subjected to compressive stress exerted between the first and second ends, the mounting arrangement comprising a first mechanical interface member for positioning against a first surface between which and a second surface the load cell is to measure compressive stress, the first mechanical interface member having a first mechanical interface member interface surface to contact the first surface substantially at a point, first coupling means for permitting non-compressive relative movement between the first surface and the first mechanical interface member interface surface substantially without altering the output signal.

2. The apparatus of claim 1 further comprising a second mechanical interface member having a second mechanical interface member interface surface to contact the second surface substantially at a point, and second coupling means for permitting non-compressive relative movement between the second surface and the second mechanical interface member interface surface substantially without altering the output signal.

3. The apparatus of claim 2 wherein the first and second coupling means comprise first and second collars for attachment to the first and second mechanical interface members, respectively, the first and second collars surrounding the first and second surfaces and resiliently maintaining the first and second surfaces, respectively, and the first and second mechanical interface member interface surfaces, respectively, substantially in alignment with each other while providing substantial isolation of the load cell from shear stress exerted between the first and second surfaces.

4. A lead cell mounting arrangement for a lead cell having first and second ends and a pair of output terminals across which an output signal appears when the lead cell is subjected to compressive stress exerted between the first and second ends, the mounting arrangement comprising a first mechanical interface member for positioning against a first surface between which and a second surface the lead cell is to measure compressive stress, the first mechanical interface member having a first mechanical interface member interface surface to contact the first surface substantially at a point, first coupling means for permitting non-compressive relative movement between the first surface and the first mechanical interface member interface surface substantially without altering the output signal, the first coupling means comprising a first collar for attachment to the first mechanical interface member, the first collar surrounding the projecting first surface and resiliently maintaining the first surface and the first mechanical interface member interface surface substantially in alignment with each other while providing substantial isolation of the load cell from shear stress exerted between the first and second surfaces.

5. A load cell mounting arrangement for a load cell having first and second ends and a pair of output terminals across which an output signal appears when the load cell is subjected to compressive stress exerted between the first and second ends, the mounting arrangement comprising a first mechanical interface member for positioning against a first surface between which and a second surface the load cell is to measure compressive stress, the first mechanical interface member having a first mechanical interface member interface surface to contact the first surface substantially at a point, first coupling means for permitting non-compressive relative movement between the first surface and the first mechanical interface member interface surface substantially without altering the output signal, a second mechanical interface member having a second mechanical interface member interface surface to contact the second surface substantially at a point, and second coupling means for permitting non-compressive relative movement between the second surface and the second mechanical interface member interface surface substantially without altering the output signal, the first and second coupling means comprising first and second collars for attachment to the first and second surfaces, respectively, the first and second collars surrounding the first and second mechanical interface member interface surfaces and resiliently maintaining the first and second surfaces, respectively, and the first and second mechanical interface member interface surfaces, respectively, substantially in alignment with each other while providing substantial isolation of the load cell from shear stress exerted between the first and second surfaces.

6. A load cell mounting arrangement for a load cell having first and second ends and a pair of output terminals across which an output signal appears when the load cell is subjected to compressive stress exerted between the first and second ends, the mounting arrangement comprising a first mechanical interface member for positioning against a first surface between which and a second surface the load cell is to measure compressive stress, the first mechanical interface member having a first mechanical interface member interface surface to contact the first surface substantially at a point, first coupling means for permitting non-compressive relative movement between the first surface and the first mechanical interface member interface surface substantially without altering the output signal, the first coupling means comprising a first collar for attachment to the first surface, the first collar surrounding the first mechanical interface member interface surface and resiliently maintaining the first surface and the first mechanical interface member interface surface substantially in alignment with each other while providing substantial isolation of the load cell from shear stress exerted between the first and second surfaces.

7. The apparatus of claim 1, 2 or 3 wherein one of the first surface and the first mechanical interface member interface surface is generally convex.

8. The apparatus of claim 7 wherein said one of the first surface and the first mechanical interface member interface surface is generally part-spherical.

9. The apparatus of claim 2 or 3 wherein one of the second surface and the second mechanical interface member interface surface is generally convex.

10. The apparatus of claim 9 wherein said one of the second surface and the second mechanical interface member interface surface is generally part-spherical.

11. The apparatus of claim 2 or 3 wherein the one of the first surface and the first mechanical interface member interface surface and one of the second surface and the second mechanical interface member interface surface are generally convex.

12. The apparatus of claim 11 wherein said one of the first surface and the first mechanical interface member interface surface and said one of the second surface and the second mechanical interface member interface surface are generally part-spherical.

13. The apparatus of claim 3 wherein the collar comprises an elastomeric O-ring.

14. The apparatus of claim 7 wherein the collar comprises an elastomeric O-ring.

15. The apparatus of claim 9 wherein the collar comprises an elastomeric O-ring.

16. The apparatus of claim 11 wherein the collar comprises an elastomeric O-ring.

17. The apparatus of claim 5 wherein the first and second coupling means comprise first and second collars for attachment to the first and second mechanical interface members, respectively, the first and second collars surrounding the first and second surfaces and resiliently maintaining the first and second surfaces, respectively, and the first and second mechanical interface member interface surfaces, respectively, substantially in alignment with each other while providing substantial isolation of the load cell from shear stress exerted between the first and second surfaces.

18. The apparatus of claim 4, 5, 6 or 17 wherein one of the first surface and the first mechanical interface member interface surface is generally convex.

19. The apparatus of claim 18 wherein said one of the first surface and the first mechanical interface member interface surface is generally part-spherical.

20. The apparatus of claim 4, 5 or 17 wherein one of the second surface and the second mechanical interface member interface surface is generally convex.

21. The apparatus of claim 20 wherein said one of the second surface and the second mechanical interface member interface surface is generally part-spherical.

22. The apparatus of claim 4, 5 or 17 wherein the one of the first surface and the first mechanical interface member interface surface and one of the second surface and the second mechanical interface member interface surface are generally convex.

23. The apparatus of claim 22 wherein said one of the first surface and the first mechanical interface member interface surface and said one of the second surface and the second mechanical interface member interface surface are generally part-spherical.

24. The apparatus of claim 4, 5, 6 or 17 wherein the collar comprises an elastomeric O-ring.

25. The apparatus of claim 18 wherein the collar comprises an elastomeric O-ring.

26. The apparatus of claim 20 wherein the collar comprises an elastomeric O-ring.

27. The apparatus of claim 22 wherein the collar comprises an elastomeric O-ring.

* * * * *